US012370580B2

(12) United States Patent
Park et al.

(10) Patent No.: US 12,370,580 B2
(45) Date of Patent: Jul. 29, 2025

(54) CLEANING DEVICE AND METHOD OF SUBSTRATE TRANSFER DEVICE

(71) Applicant: SAMSUNG ELECTRONICS CO., LTD., Suwon-si (KR)

(72) Inventors: Min Soo Park, Yongin-si (KR); Ji Hun Kim, Uiwang-si (KR); Gyeong Dam Baek, Hwaseong-si (KR); Min-Gu Chang, Seoul (KR); Tae Hyun Jo, Cheonan-si (KR); Ji Yoon Jung, Ansan-si (KR); Su Hyun Kim, Seoul (KR); Hyun Gyu Roh, Seoul (KR); Se Woong Ahn, Cheonan-si (KR); Goen Hui Kim, Daejeon (KR); Hyo Joo Jeoun, Hwaseong-si (KR)

(73) Assignees: SAMSUNG ELECTRONICS CO., LTD. (KR); SEMES CO., LTD. (KR)

( * ) Notice: Subject to any disclaimer, the term of this patent is extended or adjusted under 35 U.S.C. 154(b) by 769 days.

(21) Appl. No.: 17/673,515

(22) Filed: Feb. 16, 2022

(65) Prior Publication Data

US 2022/0280985 A1 Sep. 8, 2022

(30) Foreign Application Priority Data

Mar. 5, 2021 (KR) ........................ 10-2021-0029602

(51) Int. Cl.

| | |
|---|---|
| ***B08B 5/04*** | (2006.01) |
| ***B08B 3/02*** | (2006.01) |
| ***B61B 3/02*** | (2006.01) |
| ***E01H 8/10*** | (2006.01) |

(52) U.S. Cl.
CPC ................ *B08B 5/04* (2013.01); *B08B 3/024* (2013.01); *B61B 3/02* (2013.01); *E01H 8/105* (2013.01); *B08B 2205/00* (2013.01)

(58) Field of Classification Search
CPC ....... B08B 5/04; B08B 3/024; B08B 2205/00; B61B 3/02; E01H 8/105
See application file for complete search history.

(56) References Cited

U.S. PATENT DOCUMENTS

| | | | | |
|---|---|---|---|---|
| 9,045,147 | B2 * | 6/2015 | Kasuya | H01L 21/67733 |
| 10,170,351 | B2 * | 1/2019 | Chang | H01L 21/67745 |
| 10,665,477 | B2 * | 5/2020 | Kim | B08B 3/102 |
| 2012/0312327 | A1 | 12/2012 | Morimoto et al. | |
| 2020/0075375 | A1 * | 3/2020 | Li | H01L 21/67028 |
| 2023/0211610 | A1 * | 7/2023 | Jeon | B41J 2/16552 347/28 |

FOREIGN PATENT DOCUMENTS

| | | | |
|---|---|---|---|
| JP | 2004310385 A | | 11/2004 |
| JP | 2011189647 A | * | 9/2011 |
| JP | 2017029280 A | * | 2/2017 |

(Continued)

*Primary Examiner* — Jason C Smith
(74) *Attorney, Agent, or Firm* — Myers Bigel, P.A.

(57) ABSTRACT

A cleaning device for a substrate transfer device comprises a traveling unit configured to travel along a rail having first and second areas, a rail unit including the rail and a rail structure disposed on the rail, and a rinsing unit including a suction part disposed on the rail and that rotates about a suction nozzle. When the rinsing unit is placed in contact with the rail structure, the suction part rotates about the suction nozzle.

20 Claims, 11 Drawing Sheets

(56) References Cited

FOREIGN PATENT DOCUMENTS

| | | | | | |
|---|---|---|---|---|---|
| KR | 200415595 | Y1 | | 5/2006 | |
| KR | 20120137233 | A | | 12/2012 | |
| KR | 101298089 | B1 | | 8/2013 | |
| KR | 20140137086 | A | | 12/2014 | |
| KR | 20150124420 | A | | 11/2015 | |
| KR | 101635509 | B1 | | 7/2016 | |
| KR | 20200017830 | A | | 2/2020 | |
| KR | 20210063711 | A | * | 6/2021 | |
| TW | 202223982 | A | * | 6/2022 | ............... B08B 5/02 |
| WO | WO-2024106852 | A1 | * | 5/2024 | ............... A47L 7/02 |

* cited by examiner

CLEANING DEVICE AND METHOD OF SUBSTRATE TRANSFER DEVICE

CROSS-REFERENCE TO RELATED APPLICATION

This application claims priority to Korean Patent Application No. 10-2021-0029602, filed on Mar. 5, 2021, and all the benefits accruing therefrom under 35 U.S.C. § 119, the disclosure of which is incorporated herein by reference in its entirety.

BACKGROUND

1. Technical Field

The present disclosure relates to a cleaning device and method of a substrate transfer device.

2. Description of the Related Art

Generally, a semiconductor or display device may be fabricated by repeatedly performing a series of processes on a substrate such as a silicon wafer or a glass substrate. For example, various fabricating processes such as deposition, photolithography, oxidation, ion implantation, or rinsing may be selectively and/or repeatedly performed to form circuit patterns on a substrate.

These fabricating processes may be performed in a clean room where contamination is managed. During these fabricating processes, substrates may be provided to, or retrieved from, processing equipment by a carrier with multiple substrates loaded thereon such as, for example, a front opening unified pod (FOUP) or a front opening shipping box (FOSB), and the carrier may be transferred by an overhead hoist transport (OHT). The OHT transfers and loads a carrier having loaded thereon substrates yet to be processed into an empty storage structure, and picks up and retrieves a carrier having loaded thereon substrates that are already processed from the storage structure.

A ceiling transport device such as an OHT may include a rail installed at the ceiling of a clean room and a traveling unit configured to be able to move along the rail. A hoist unit may be mounted below the rail to transfer a target object.

Unfortunately, contaminants may be generated in a rail unit of a ceiling transport device due to friction between the traveling unit and the rail unit.

SUMMARY

Embodiments of the present disclosure provide a cleaning device and method for a substrate transfer device, which are for effectively removing contaminants generated by rolling contact between a rail unit and a traveling unit of an overhead transport device.

However, embodiments of the present disclosure are not restricted to those set forth herein. The below and other embodiments of the present disclosure will become more apparent to one of ordinary skill in the art to which the present disclosure pertains by referencing the detailed description of the present disclosure given below.

According to an embodiment of the present disclosure, there is provided a cleaning device for a substrate transfer device, the cleaning device comprising a traveling unit configured to travel along a rail having first and second areas, a rail unit including the rail and a rail structure disposed on the rail, and a rinsing unit including a suction part. The suction part is disposed on the rail and is configured to rotate about a suction nozzle. The rinsing unit is configured such that, when placed in contact with the rail structure, the suction part simultaneously rotates about the suction nozzle.

According to the aforementioned and other embodiments of the present disclosure, there is provided a cleaning device for a substrate transfer device, the cleaning device comprising a traveling unit configured to travel along a rail to transfer a substrate, a rail unit including the rail and a rail structure disposed on the rail, and a rinsing unit including a suction part disposed on the rail. The suction part is configured to rotate in response to receiving an elastic force from an elastic member. The rinsing unit is configured such that, when is placed in contact with the rail structure, the suction part rotates simultaneously.

According to the aforementioned and other embodiments of the present disclosure, there is provided a cleaning method for a substrate transfer device, using a cleaning device of the substrate transfer device. The substrate transfer device includes a rail unit having a rail and a rail structure, a traveling unit configured to travel on the rail, and a rinsing unit having a suction part. The cleaning method includes moving the traveling unit into a first area of the rail and performing a first traveling process in which the rinsing unit is placed in contact with the rail structure and the suction part simultaneously rotates in a first direction, and then moving the traveling unit into a second area and performing a second traveling process in which the rail structure and the rinsing unit become detached from each other and the suction part simultaneously rotates in a second direction opposite to the first direction.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

BRIEF DESCRIPTION OF THE DRAWINGS

The above and other embodiments and features of the present disclosure will become more apparent by describing in detail embodiments thereof with reference to the attached drawings, in which.

DETAILED DESCRIPTION

Figure 1:
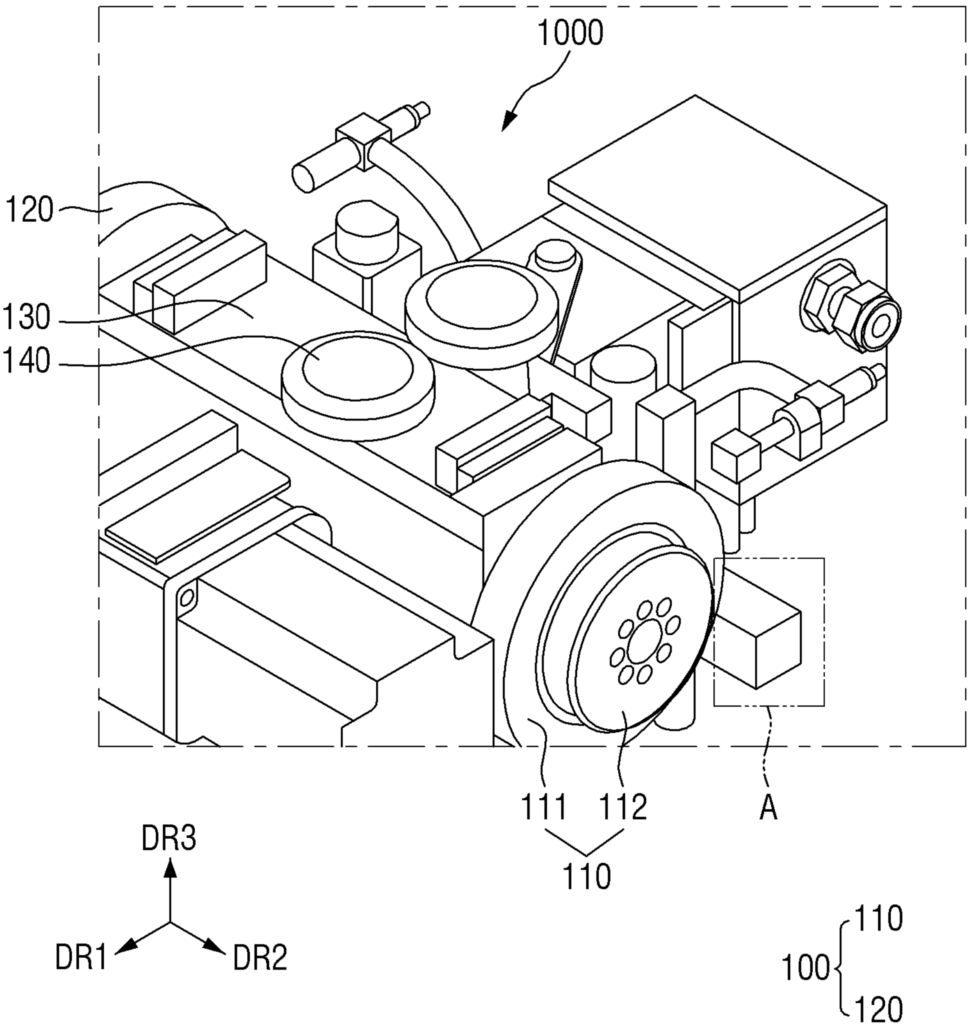
FIG. 1 is a perspective view of a cleaning device of a substrate transfer device according to some embodiments of the present disclosure.
Figure 2:
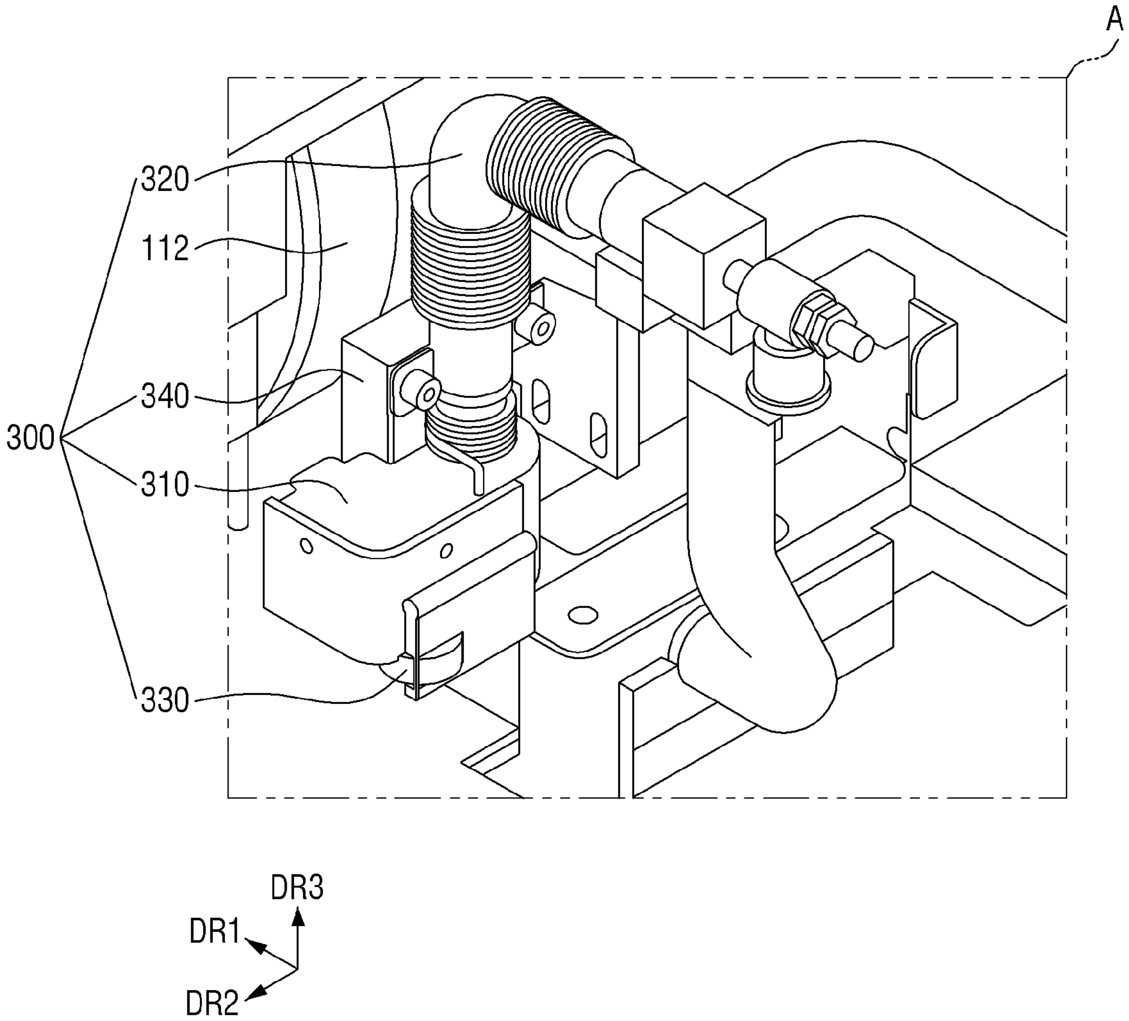
FIG. 2 is an enlarged perspective view of part A of FIG. 1.
Figure 3:
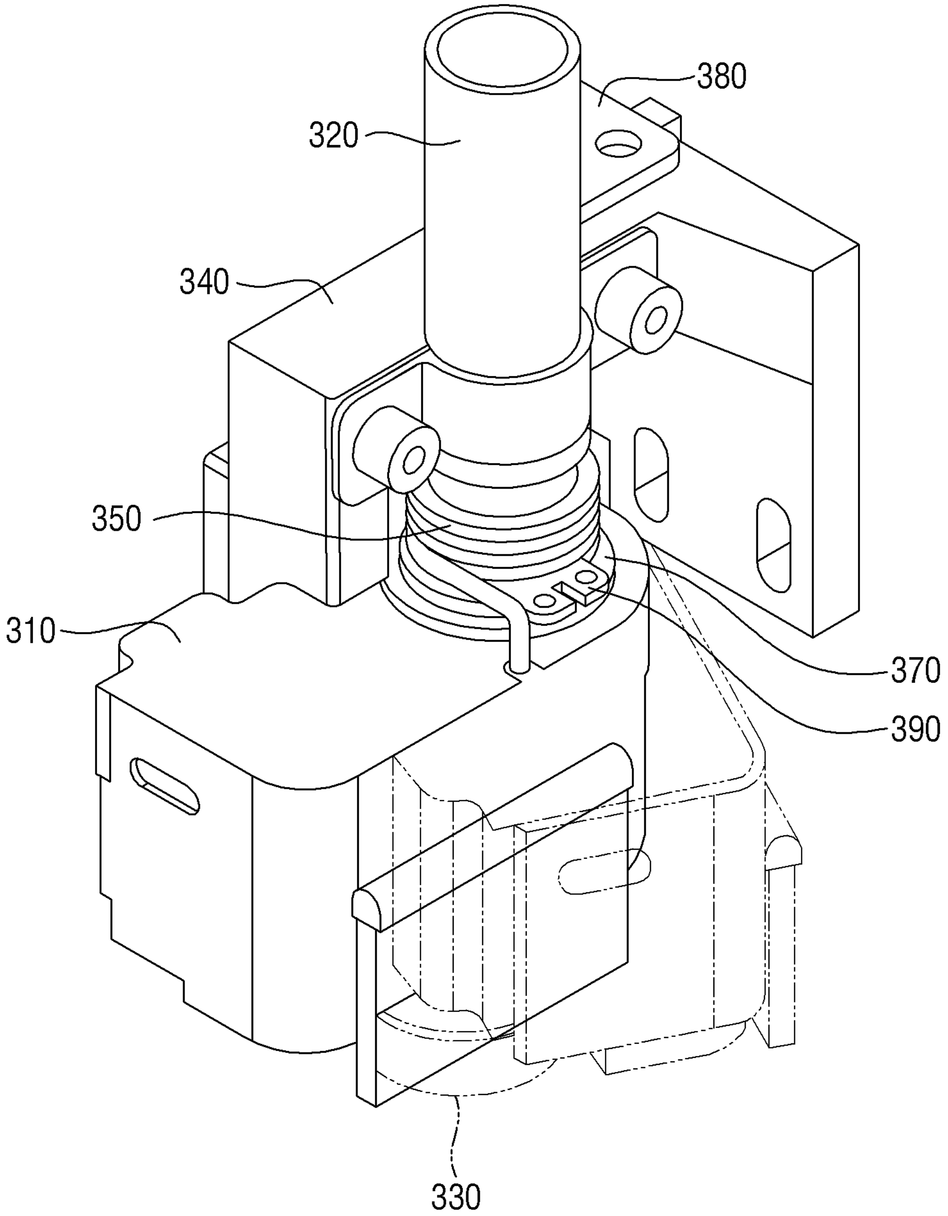
FIG. 3 is a perspective view illustrating how a suction part of a rinsing unit of FIG. 1 rotates.
Figure 4:
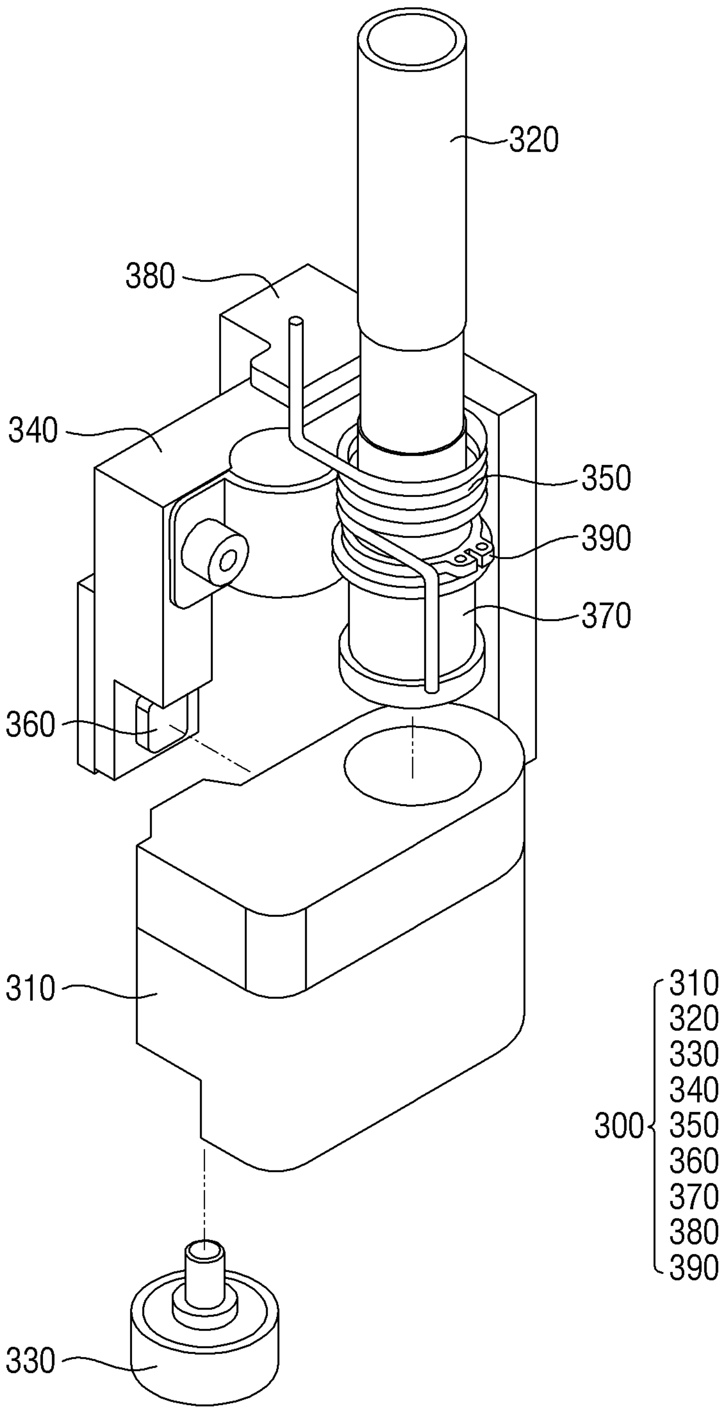
FIG. 4 is an exploded perspective view of the rinsing unit of FIG. 1.
Figure 5:
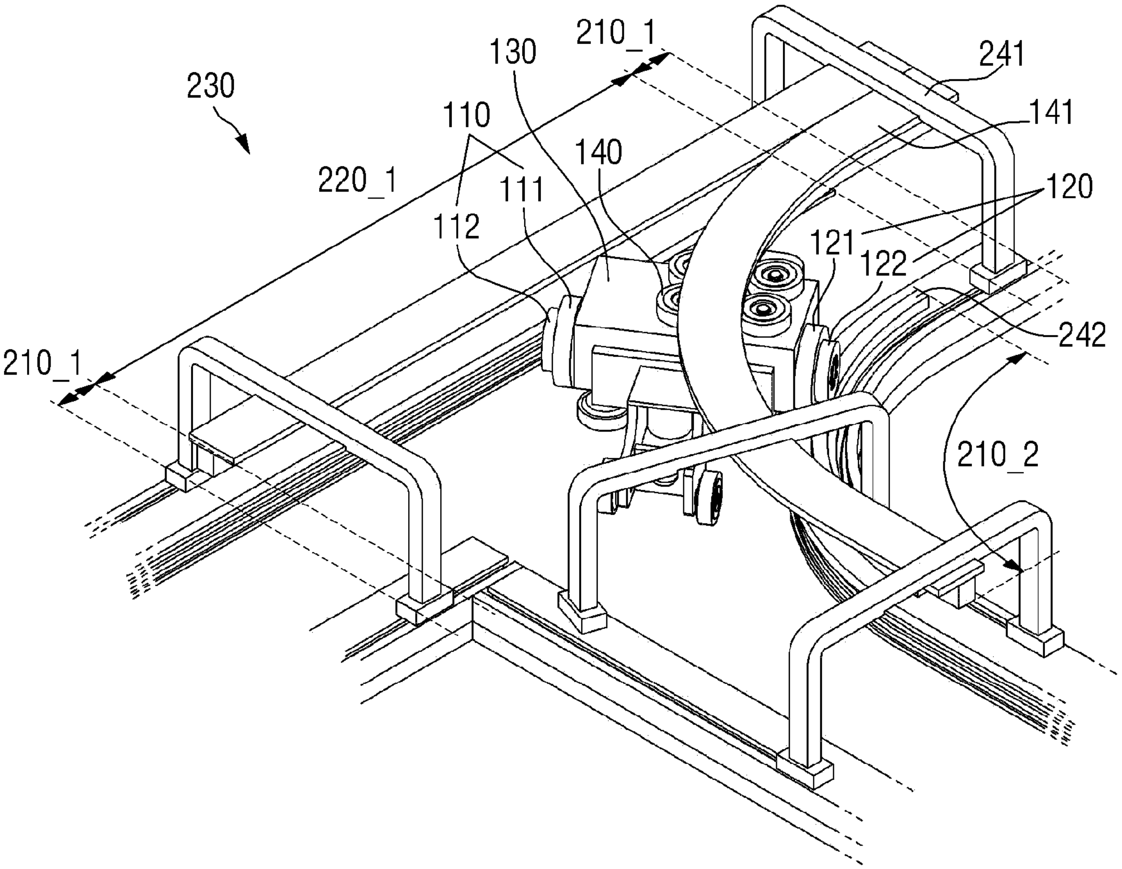
FIG. 5 is a perspective view illustrating how a traveling unit of the cleaning device of FIG. 1 travels on a rail.
Figure 5:
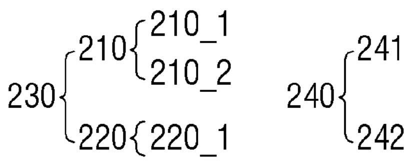
Figure 6:
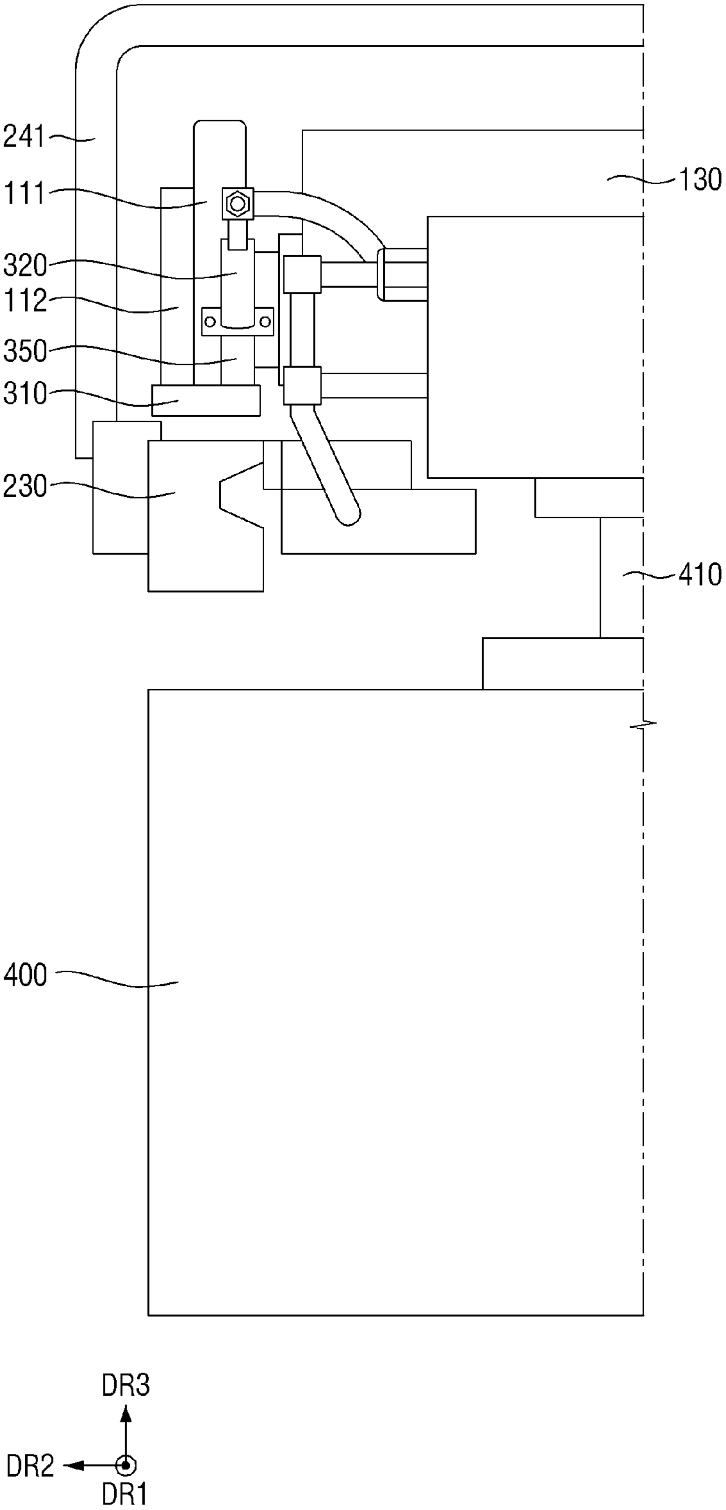
FIG. 6 is a rear view of the cleaning device of FIG. 1 as viewed from the rear in its traveling direction.

FIG. 1 is a perspective view of a cleaning device of a substrate transfer device according to some embodiments of the present disclosure. FIG. 2 is an enlarged perspective view of part A of FIG. 1. FIG. 3 is a perspective view illustrating how a suction part of a rinsing unit of FIG. 1 rotates. FIG. 4 is an exploded perspective view of the rinsing unit of FIG. 1. FIG. 5 is a perspective view illustrating how a traveling unit of the cleaning device of FIG. 1 travels on a rail. FIG. 6 is a rear view of the cleaning device of FIG. 1 as viewed from the rear in its traveling direction.

Referring to FIGS. 1 and 2, a cleaning device 1000 of a substrate transfer device may include a traveling unit 100, a rail unit 200, and a rinsing unit 300.

A direction DR1 may refer to the traveling direction of the traveling unit 100. A direction DR2, which is different from the direction DR1, may refer to a direction intersecting the direction DR1. A direction DR3, which is different from the directions DR1 and DR2, may refer to a direction intersecting both the directions DR1 and DR2.

The traveling unit 100 includes first and second driving wheels 110 and 210 (FIG. 5), which are disposed on a rail 230 (FIG. 6) to be spaced apart from each other in the direction DR2, and a traveling part 130, on which the first and second driving wheels 110 and 120 are mounted. Referring to FIG. 5, the first driving wheel 110 includes a first traveling wheel 111 and a first guide wheel 112, and the second driving wheel 120 includes a second traveling wheel 121 and a second guide wheel 122. Also, the traveling unit 100 may be provided with an auxiliary wheel 140, which is disposed on the traveling part 130 and supports and guides the traveling unit 100 at any branch point.

As the location of the auxiliary wheel 140 changes, the traveling unit 100 may branch off to a curved part of the rail 230. Once the traveling unit 100 enters a curved part of the rail 230, the traveling unit 100 may be driven by the first and second guide wheels 112 and 122, rather than by the first and second traveling wheels 111 and 121.

The auxiliary wheel 140 may be provided on the top surface of the traveling unit 100 and may rotate in contact with the auxiliary rail 141. As the auxiliary wheel 140 is in contact with a curved part of the auxiliary rail 141, the traveling unit 100 may diverge in a branch area of the rail 230 or may converge in a junction area of the rail 230. Since the auxiliary wheel 140 rotates in contact with the auxiliary rail 141, the auxiliary wheel 140 may guide the traveling direction of the traveling unit 100 in the branch or junction area of the rail 230.

The rail unit 200 includes the rail 230 and a rail structure 240, which is disposed on the rail 230, as illustrated in FIG. 5. Although not specifically illustrated, the rail 230 includes first and second rails that are spaced apart from each other in the second direction DR2. Also, the rail 230 has a first area 210, in which the rail structure 240 is disposed, and a second area 220, which is connected to the first area 210 and in which the rail structure 240 is not disposed. The first area 210 includes a first straight part 210_1 and a first curved part 210_2, and the second area 220 includes a second straight part 220_1.

The rail structure 240 includes a rail support 241 in the first straight 210_1 of the first area 210 and a guide rail 242 in the first curved part 210_2 of the first area 210. The rail support 241 maintains balance in the rail unit 200 by maintaining the distance between parts of the rail 230. The guide rail 242 may adjust balance in the traveling unit 100 by preventing a slip of the first and second driving wheels 110 and 120 when the traveling unit 100 is traveling on each curved part of the rail 230.

The rinsing unit 300 (FIG. 4) includes a suction nozzle 320 and a suction part 310, which is disposed on the rail 230 to rotate about the suction nozzle 320. The rinsing unit 300 is placed in contact with the rail structure 240, and at the same time (i.e., substantially simultaneously), the suction part 310 rotates about the suction nozzle 320, as illustrated in FIG. 3. The suction part 310 may receive an elastic force from an elastic member 350 that will be described later and may thus be able to rotate. Although not specifically illustrated, the suction part 310 may include first and second suction parts, which are disposed on the first and second rails, respectively.

The rinsing unit 300 is in contact with the rail support 241 in the first straight part 210_1 of the first area 210 and with the guide rail 242 in the curved part 210_2 of the first area 210. The rinsing unit 300 may further include a guide roller 330, which guides the suction part 310 on the rail 230. A side surface of the rail structure 240 is in contact with the guide roller 330. That is, the inner side surface of the rail support 241 is in contact with the guide roller 330 in the first straight part 210_1 of the first area 210 and with the guide roller 330 in the curved part 210_2 of the first area 210.

Figure 7:
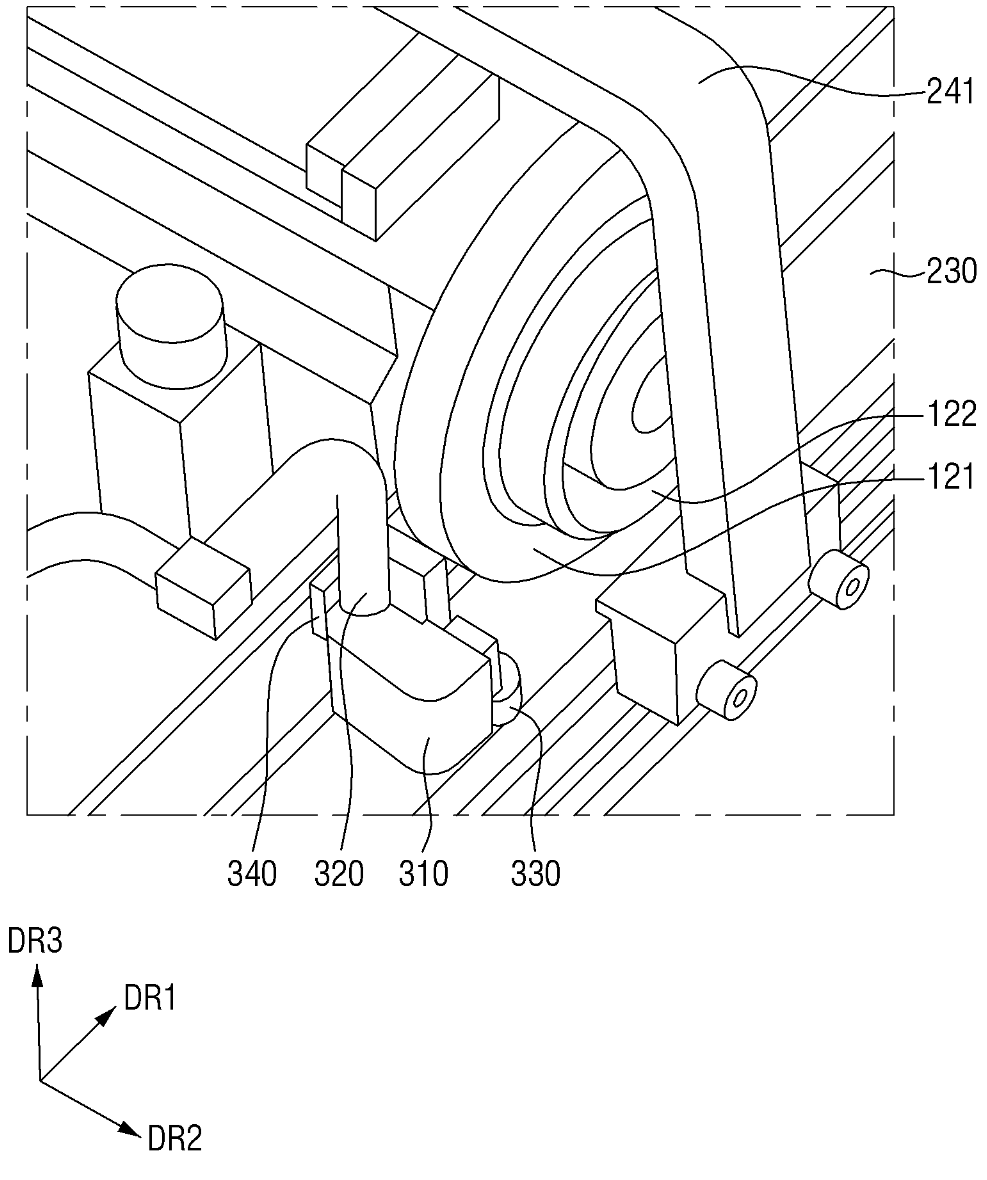
FIG. 7 is a perspective view illustrating how the cleaning device of FIG. 1 travels along a straight part of the rail of FIG. 5.
Figure 8A:
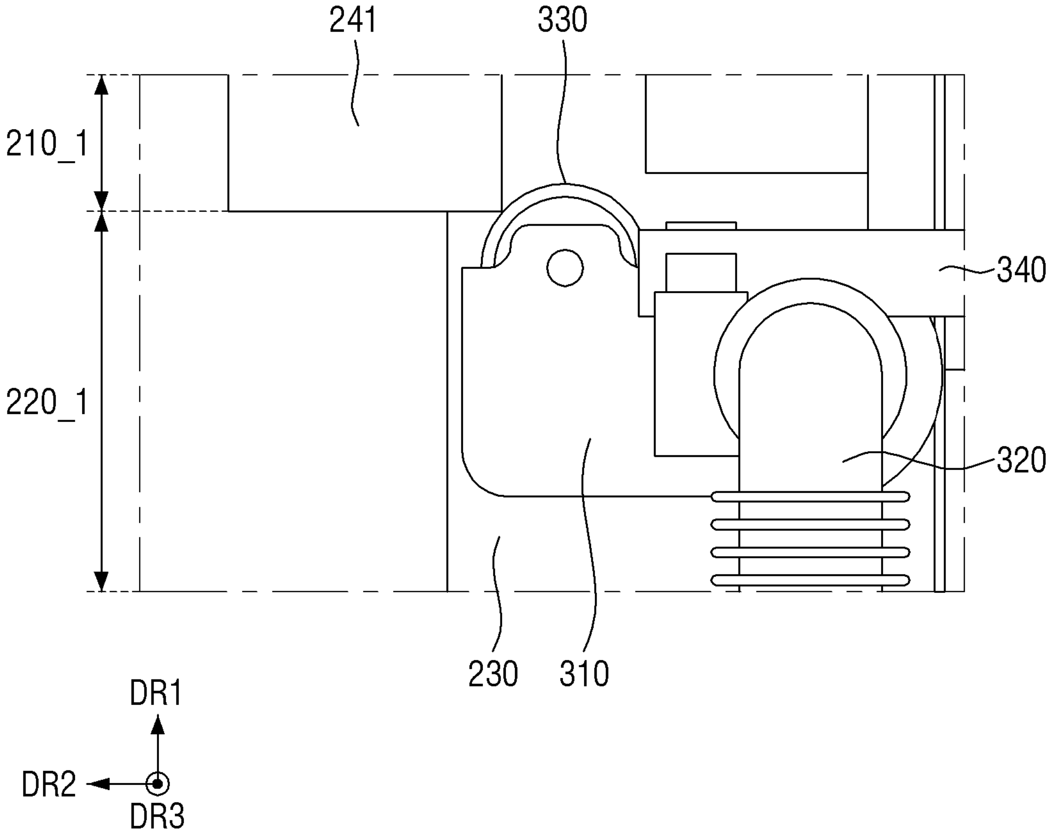
FIG. 8A is a top view illustrating how the cleaning device of FIG. 1 travels along the straight part of the second area of the rail of FIG. 5.
Figure 8B:
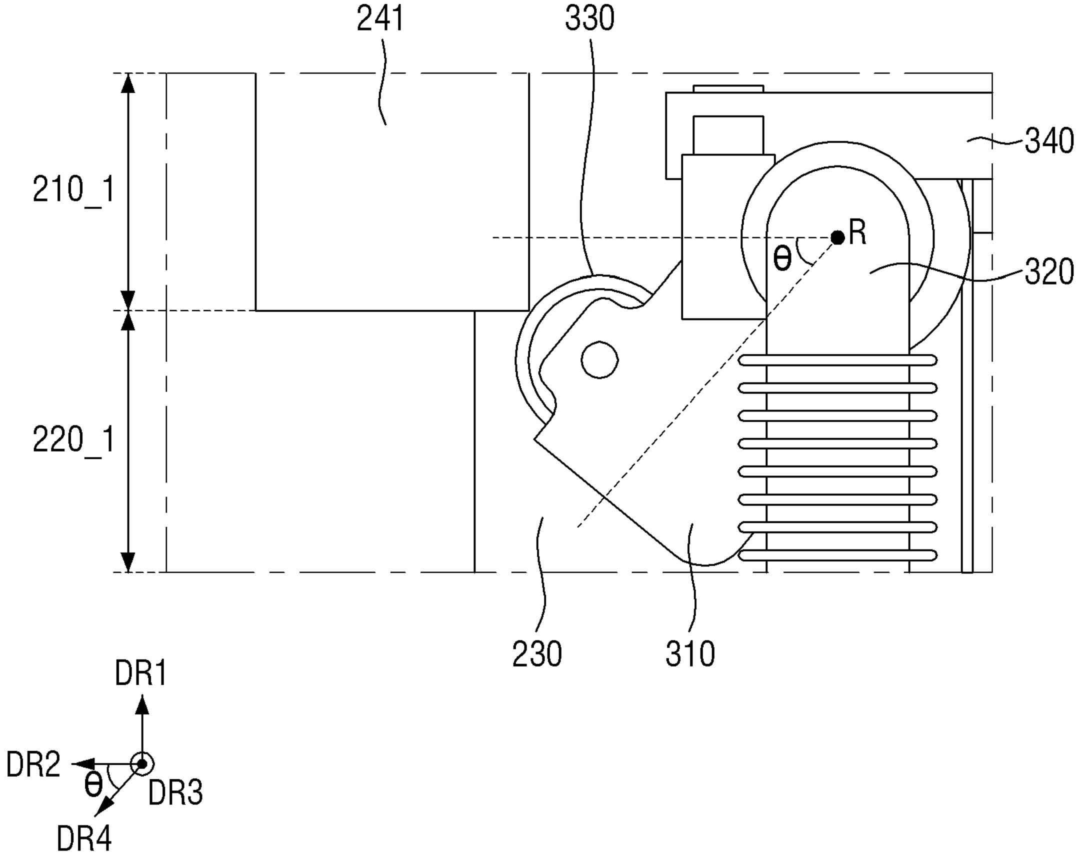
FIG. 8B is a top view illustrating how the cleaning device of FIG. 1 enters a straight part of the first area of the rail of FIG. 5.
Figure 9:
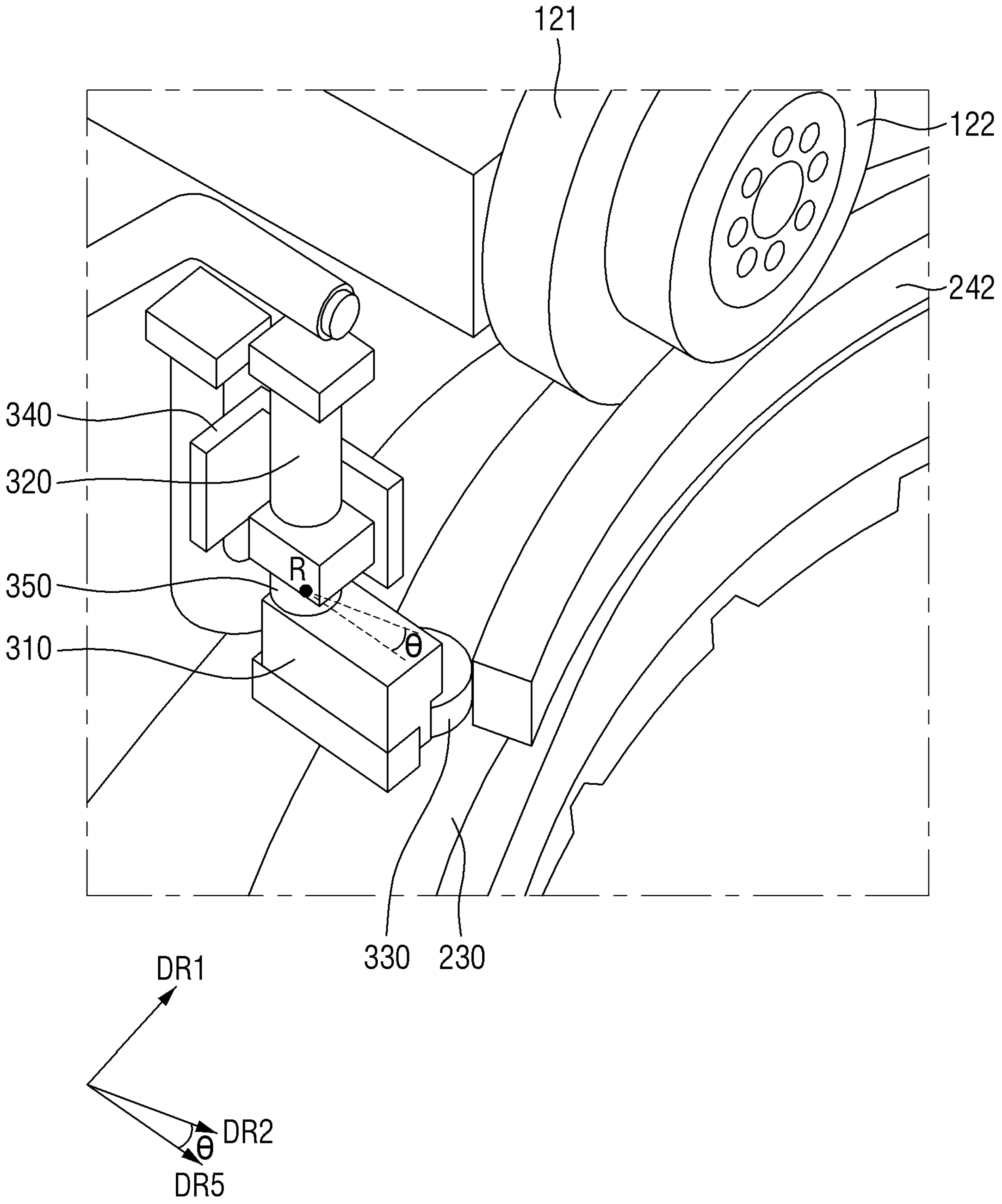
FIG. 9 is a perspective view illustrating how the cleaning device of FIG. 1 travels on a curved part of the rail of FIG. 5.
Figure 10:
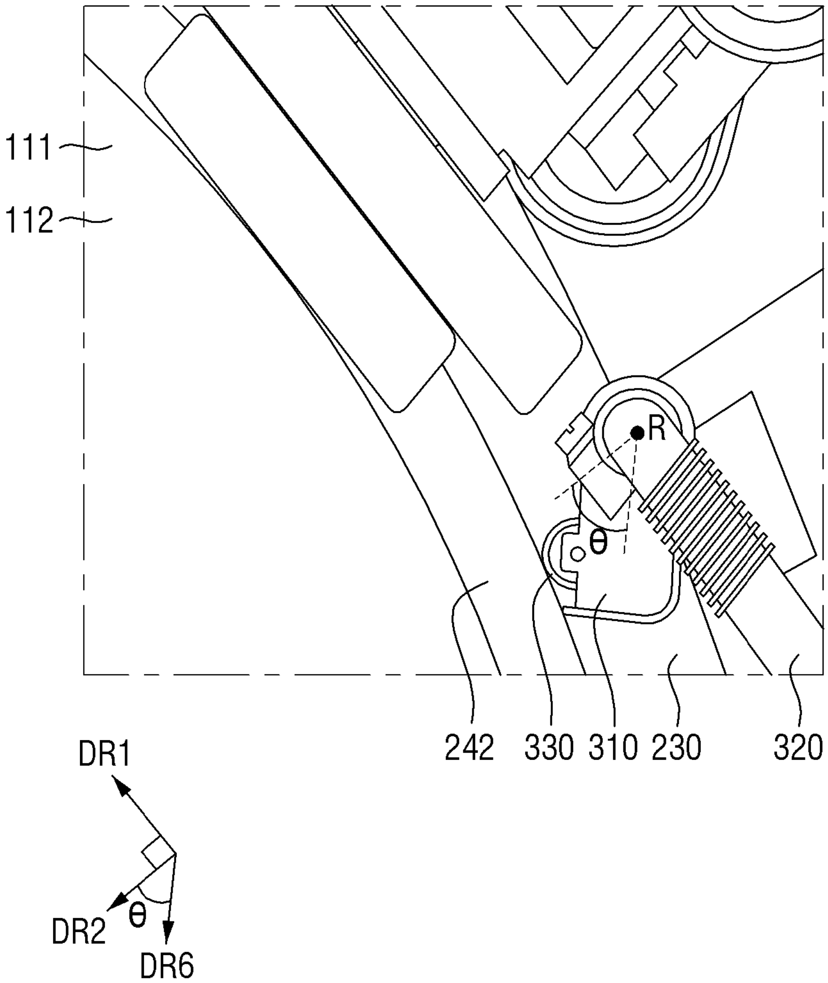
FIG. 10 is a top view illustrating how the cleaning device of FIG. 1 travels on the curved part of the first area of the rail of FIG. 5.

FIG. 7 is a perspective view illustrating how the cleaning device of FIG. 1 travels along a straight part of the rail of FIG. 5. FIG. 8A is a top view illustrating how the cleaning device of FIG. 1 travels along the straight part of the second area of the rail of FIG. 5. FIG. 8B is a top view illustrating how the cleaning device of FIG. 1 enters a straight part of the first area of the rail of FIG. 5. FIG. 9 is a perspective view illustrating how the cleaning device of FIG. 1 travels on a curved part of the rail of FIG. 5. FIG. 10 is a top view illustrating how the cleaning device of FIG. 1 travels on the curved part of the first area of the rail of FIG. 5.

Referring to FIG. 8A, the traveling unit 100 travels on the second straight part 220_1 of the second area 220 before entering the first straight part 210_1 of the first area 210.

Referring to FIG. 8B, in the first straight part 210_1 of the first area 210, the rinsing unit 300 is placed in contact with the rail support 241, and at the same time, the suction part 310 rotates in a first direction. That is, a first traveling process is performed in which the entrance of the traveling unit 100 into the first area 210 of the rail 230, the placement of the rinsing unit 300 in contact with the rail support 240, and the rotation of the suction part 310 in the first direction are all performed at the same time.

Thereafter, in the second straight part 220_1 of the second area 220, the rail support 241 and the rinsing unit 300 are detached from each other, and at the same time, the suction part 310 rotates in a second direction opposite to the first direction. That is, a second traveling process is performed in which the entrance of the traveling unit 100 into the second area 220, which is connected to the first area 210, away from the first area 210, the detachment of the rinsing unit 300 from the rail structure 240, and the rotation of the suction part 310 in the second direction are all performed at the same time.

Referring to FIGS. 9 and 10, in the first curved part 210_2 of the first area 210, the rinsing unit 300 is placed in contact with the guide rail 242, and at the same time, the suction part 310 rotates in the first direction. That is, the first traveling process is performed in which the entrance of the traveling unit 100 into the first area 210 of the rail 230, the placement of the rinsing unit 300 in contact with the rail support 240, and the rotation of the suction part 310 in the first direction are all performed at the same time.

Thereafter, in the second straight part 220_1 of the second area 220, the rail support 241 and the rinsing unit 300 are detached from each other, and at the same time, the suction part 310 rotates in the second direction. That is, a second traveling process is performed in which the entrance of the traveling unit 100 into the second area 220, which is connected to the first area 210, away from the first area 210, the detachment of the rinsing unit 300 from the rail structure 240, and the rotation of the suction part 310 in the second direction are all performed at the same time.

In the first area 210 of the rail 230, the suction part 310 is disposed to form a predetermined angle θ with a direction in which the rinsing unit 300 retreats from the rail structure 240, i.e., a direction DR4, DR5, or DR6, with respect to a central axis R of the suction nozzle 320.

Referring to FIGS. 8B and 10, the suction part 311 is placed at a location rotated by as much as the predetermined angle θ counterclockwise from the direction DR2. For example, the rotation angle of the suction part 311 may be 90° or less.

Referring to FIG. 9, the suction part 310 may be disposed at a location rotated by as much as the predetermined angle θ clockwise from the direction DR2. For example, the rotation angle of the suction part 311 may be 90° or less. That is, during the first traveling process, the suction part 310 is disposed at a location rotated by as much as the predetermined angle θ clockwise from the direction DR2, which intersects the direction where the travel unit 100 travels, i.e., the direction DR1.

Referring to FIG. 8A, in the second area 220 of the rail 230, the suction part 310 is disposed in the direction DR2, which intersects the direction where the travel unit 100 travels, i.e., the direction DR1. That is, during the second traveling process, the suction part 320 is disposed in the direction DR2. As the first and second traveling processes are repeatedly performed, any contaminants on the rail unit 200 can be effectively rinsed off by the rinsing unit 300.

That is, as the suction part 310 of the rinsing unit 300 is rotated by as much as the predetermined angle θ, a rinsing area can be further secured on the rail unit 200. Also, as the first and second traveling processes can be repeatedly performed without stopping the traveling unit 100, the efficiency of a rinsing process can be improved.

The rinsing unit 300 may further include a support member 340, which supports the suction part 310 and the suction nozzle 320, and a buffer member 360, which is disposed on the support member 340. The support member 340 may prevent the suction part 310 from being rotated too excessively, and the buffer member 360 may buffer (i.e., reduce) shock and/or vibration that may result from the rotation of the suction part 310. The support member 340 may include, for example, aluminum (Al). The buffer member 360 may include, for example, urethane.

The rinsing unit 300 may further include the elastic member 350, which provides an elastic force for rotating the suction part 310. The elastic member 350 may be, for example, a torsion spring. The rinsing unit 300 may further include a rotation guide member 370, which is disposed between the suction nozzle 320 and the suction part 310 and helps the rotation of the suction part 310. The rinsing unit may further include a ring 390, which is disposed between the elastic member 350 and the rotation guide member 370. As the rotation guide member 370 guides the rotation of the suction part 310, the suction part 310 can be smoothly moved. The rotation guide member 370 may be, for example, a linear bushing.

The rinsing unit 300 may further include a sensor bracket 380, which can detect the location, in the direction DR3, of the rinsing unit 300. Although not specifically illustrated, the rinsing unit 300 may further include a blocking sheet outside the suction part 310. The blocking sheet can improve the suction efficiency of the suction part 310 by blocking the influence of external foreign materials or wind on the suction of any contaminants by the suction part 310 to raise differential pressure.

Although not specifically illustrated, a base panel may be disposed above the rail unit 200. The base panel may be installed near the ceiling of a semiconductor production line. The base panel may extend in a direction parallel to the rail 230, i.e., in the direction DR1. A plurality of base panels may be formed to be spaced apart from the direction DR2, which intersects the direction DR1. An auxiliary rail 141, which is for controlling the location of the auxiliary wheel 140, may be disposed at the bottom(s) of the base panel(s).

Referring to FIG. 6, a hoist unit 400 is disposed below the rail 230 and is transferred by the traveling unit 100. The hoist unit 400 is disposed below the rail 230 by being connected to the traveling unit 100 via a connecting shaft 410. In some embodiments, the hoist unit 400 may transfer a carrier with substrates loaded thereon between processing facilities where semiconductor fabricating processes are performed.

Embodiments of the present disclosure have been described above with reference to the accompanying drawings, but the present disclosure is not limited thereto and may be implemented in various different forms. It will be understood that the present disclosure can be implemented in other specific forms without changing the present disclosure. Therefore, it should be understood that the embodiments set forth herein are illustrative in all respects and not limiting.

What is claimed is:

1. A cleaning device for a substrate transfer device, the cleaning device comprising:

a traveling unit configured to travel along a rail, the rail comprising first and second areas;

a rail unit comprising the rail and a rail structure disposed on the rail; and a rinsing unit attached to the traveling unit, the rinsing unit comprising a suction part configured to rotate about a suction nozzle, wherein the rinsing unit is configured such that, when placed in contact with the rail structure in response to movement of the traveling unit, the suction part simultaneously rotates horizontally about the suction nozzle, and a rotation angle of the suction part in a horizontal direction is 90 degrees or less.

2. The cleaning device of claim 1, wherein the first area comprises a straight part and a curved part, the second area comprises a straight part, the rail structure comprises a rail support in the straight part of the first area and a guide rail in the curved part of the first area, and the rinsing unit is in contact with the rail support in the straight part of the first area and with the guide rail in the curved part of the first area.

3. The cleaning device of claim 2, wherein, when the rinsing unit is in the straight part of the second area, the rail support and the rinsing unit are detached from each other, and the suction part rotates in a second direction opposite to a first direction in which the suction part rotates in the straight part of the first area.

4. The cleaning device of claim 2, wherein, when the rinsing unit is in the straight part of the second area, the guide rail and the rinsing unit are detached from each other, and the suction part rotates in a second direction opposite to a first direction in which the suction part rotates in the straight part of the first area.

5. The cleaning device of claim 1, wherein, when the rinsing unit is in the first area of the rail, the suction part is oriented at a predetermined angle relative to a direction intersecting a direction in which the traveling unit travels.

6. The cleaning device of claim 5, wherein the rail comprises first and second rails, wherein the first and second rails are spaced apart from each other in the direction intersecting the direction in which the traveling unit travels, the traveling unit comprises first and second driving wheels disposed on the first and second rails, respectively, the suction part comprises first and second suction parts disposed on the first and second rails, respectively, the first suction part is oriented at a predetermined angle relative to a direction intersecting a direction in which the first driving wheel travels, and the second suction part is oriented at a predetermined angle relative to a direction intersecting a direction in which the second driving wheel travels.

7. The cleaning device of claim 1, wherein, when the rinsing unit is in the second area of the rail, the suction part is oriented in a direction that intersects a direction in which the traveling unit travels.

8. The cleaning device of claim 1, wherein the rinsing unit further comprises a guide roller configured to guide the suction part on the rail, and a side surface of the rail structure is in contact with the guide roller.

9. The cleaning device of claim 1, wherein the rinsing unit further comprises a support member configured to support the suction part and the suction nozzle.

10. The cleaning device of claim 9, further comprising:

a buffer member disposed on the support member, wherein the buffer member is configured to reduce shock and/or vibration during rotation of the suction part.

11. The cleaning device of claim 1, wherein the rinsing unit further comprises an elastic member configured to rotate the suction part.

12. The cleaning device of claim 1, wherein the rinsing unit further comprises a guide member disposed between the suction nozzle and the suction part.

13. A cleaning device for a substrate transfer device, the cleaning device comprising:

a traveling unit configured to travel along a rail to transfer a substrate;

a rail unit comprising the rail and a rail structure disposed on the rail; and a rinsing unit attached to the traveling unit, the rinsing unit comprising a suction part and an elastic member, wherein the suction part rotates in a first horizontal direction when the rinsing unit is placed in contact with the rail structure in response to movement of the traveling unit along the rail, and wherein the suction part rotates in a second horizontal direction opposite to the first horizontal direction in response to receiving an elastic force from the elastic member when the rinsing unit is no longer in contact with the rail structure, and a rotation angle of the suction part in each of the first horizontal direction and the second horizontal direction is 90 degrees or less.

14. The cleaning device of claim 13, wherein the rail comprises a first area in which the rail structure is disposed, wherein the first area has a straight part and a curved part, and wherein the rail comprises a second area connected to the first area, the rail structure comprises a rail support in the straight part of the first area and a guide rail in the curved part of the first area, and the rinsing unit is in contact with the rail support in the straight part of the first area and with the guide rail in the curved part of the first area.

15. The cleaning device of claim 14, wherein, when the rinsing unit is in the straight part of the second area, the rail support and the rinsing unit are detached from each other, and the suction part rotates in a direction opposite to a direction in which the suction part rotates in the straight part of the first area.

16. The cleaning device of claim 14, wherein, when the rinsing unit is in the straight part of the second area, the guide rail and the rinsing unit are detached from each other, and the suction part rotates in a direction opposite to a direction in which the suction part rotates in the straight part of the first area.

17. A cleaning method for a substrate transfer device, wherein the substrate transfer device comprises a rail unit having a rail and a rail structure, a traveling unit configured to travel on the rail, and a rinsing unit having a suction part, wherein the rinsing unit is attached to the traveling unit, the cleaning method comprising:

moving the traveling unit into a first area of the rail and performing a first traveling process in which the rinsing unit is placed in contact with the rail structure, and the suction part rotates in a first horizontal direction in response to movement of the traveling unit in the first area of the rail; and moving the traveling unit into a second area of the rail and performing a second traveling process in which the rail structure and the rinsing unit become detached from each other, and the suction part rotates in a second horizontal direction opposite to the first horizontal direction in response to an elastic force from an elastic member associated with the rinsing unit, and a rotation angle of the suction part in each of the first horizontal direction and the second horizontal direction is 90 degrees or less.

18. The cleaning method of claim 17, wherein the first area comprises a straight part and a curved part, the rail structure comprises a rail support in the straight part of the first area and a guide rail in the curved part of the first area, and the rinsing unit is in contact with the rail support in the straight part of the first area and with the guide rail in the curved part of the first area.

19. The cleaning method of claim 17, wherein during the first traveling process, the suction part is oriented at a predetermined angle relative to a direction that intersects a direction in which the traveling unit travels, and during the second traveling process, the suction part is oriented in the direction that intersects the direction in which the traveling unit travels.

20. The cleaning method of claim 17, further comprising:

rinsing off contaminants on the rail unit by repeatedly performing the first and second traveling processes.

* * * * *